United States Patent [19]

Negishi

[11] Patent Number: 5,627,803
[45] Date of Patent: May 6, 1997

[54] MAGNETO OPTICAL RECORDING MEDIUM INCLUDING A PLURALITY OF MAGNETIC LAYERS AND A METHOD FOR REDUCING THEREOF

[75] Inventor: Nobuyasu Negishi, Tsurugashima, Japan

[73] Assignee: Pioneer Electronic Corporation, Japan

[21] Appl. No.: 512,978

[22] Filed: Aug. 9, 1995

[30] Foreign Application Priority Data

Aug. 11, 1994 [JP] Japan .................... 6-189512

[51] Int. Cl.$^6$ .............. G11B 11/00; G11B 5/70
[52] U.S. Cl. .................. 369/13; 428/694 MM
[58] Field of Search .............. 369/13, 14, 275.2, 369/110; 360/59, 114; 365/122; 428/64.3, 694 R, 694 ML, 694 SC, 694 MT, 694 MM, 694 EC

[56] References Cited

U.S. PATENT DOCUMENTS

| | | | |
|---|---|---|---|
| 5,018,119 | 5/1991 | Aratani et al. | 369/13 |
| 5,168,482 | 12/1992 | Aratani et al. | 369/13 |
| 5,218,581 | 6/1993 | Ohta et al. | 369/13 |
| 5,241,520 | 8/1993 | Ohta et al. | 369/13 |
| 5,283,770 | 2/1994 | Nakao et al. | 369/13 |
| 5,420,728 | 5/1995 | Kawase | 369/13 |

Primary Examiner—Tan Dinh
Attorney, Agent, or Firm—Nixon & Vanderhye

[57] ABSTRACT

A magneto optical recording medium is provided with: a record layer, to which information is recorded as a directional condition of magnetization thereof and which comprises a magnetic substance having a Curie temperature $Tc_2$; a reproduction layer, to which the magnetization of the record layer is transferred at a predetermined reproducing temperature Tpb and which comprises a magnetic substance having a Curie temperature $Tc_0$; an intermediate layer disposed between the record layer and the reproduction layer and comprising a magnetic substance having a Curie temperature $Tc_1$ for allowing the magnetization of the record layer to be transferred therethrough at a temperature lower than the Curie temperature $Tc_1$ by a switched connection force between the record layer and the intermediate layer and by a switched connection force between the intermediate layer and the reproduction layer, and for disallowing the magnetization of the record layer to be transferred therethrough at a temperature not lower than the Curie temperature $Tc_1$; and an intermediate auxiliary layer interposed between the record layer and the intermediate layer and comprising a magnetic substance having a Curie temperature $Tc_3$ for increasing the switched connection force between the record layer and the intermediate layer. The Curie temperatures satisfy conditions of: $Tc_1 < Tpb < Tc_2 < Tc_0$ and $Tc_1 \leq Tc_3 \leq Tc_2$.

9 Claims, 9 Drawing Sheets

| COMPOSITION | FILM THICKNESS | |
|---|---|---|
| PC | — | 2 |
| SiN | 45 nm | 3 |
| Pt/Co | 10 nm | 4 |
| DyFeCo | 10 nm | 5 |
| COMPOSITION A* | 8 nm | 6 |
| TbFeCo | 80 nm | 7 |
| SiN | 70 nm | 8 |

COMPOSITION A : $(Tb_{50}Dy_{50})_{19}(Fe_{90}Co_{10})_{81}$ [at%]

COMPOSITION B: $(Tb_3 Dy_{97})_{19} (Fe_{90} Co_{10})_{81}$ [at%]

FIG. 7A

COMPARISON EXAMPLE 1

| COMPOSITION | FILM THICKNESS | | |
|---|---|---|---|
| PC | — | | 2 |
| SiN | 45nm | | 3 |
| Pt/Co | 10nm | | 4 |
| TbFe | 10nm | | 5 |
| TbFeCo | 80nm | | 7 |
| SiN | 70nm | | 8 |

FIG. 7B

COMPARISON EXAMPLE 2

| COMPOSITION | FILM THICKNESS | | |
|---|---|---|---|
| PC | — | | 2 |
| SiN | 45nm | | 3 |
| Pt/Co | 10nm | | 4 |
| DyFeCo | 10nm | | 5a |
| TbFeCo | 80nm | | 7 |
| SiN | 70nm | | 8 |

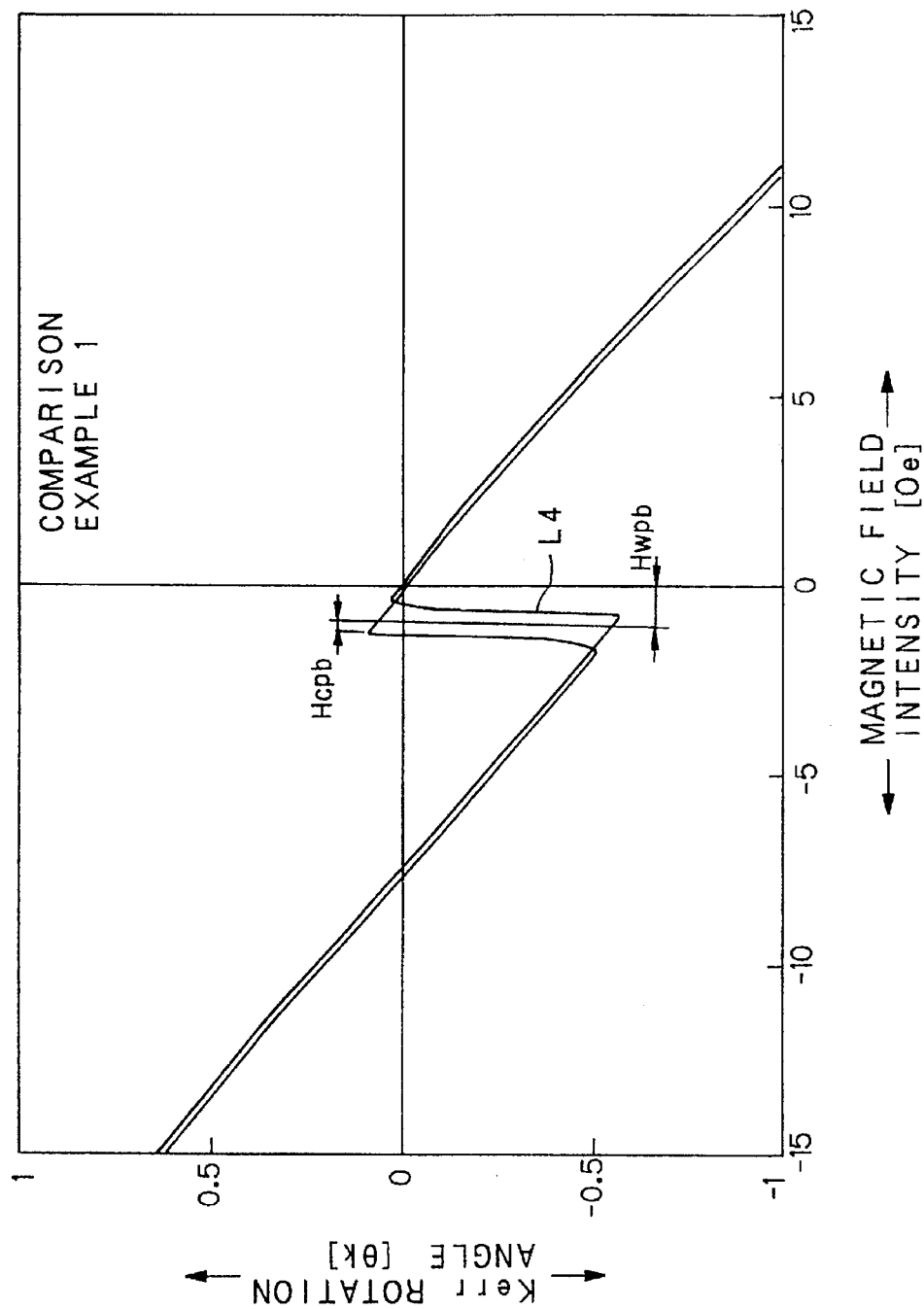

5,627,803

1

MAGNETO OPTICAL RECORDING MEDIUM INCLUDING A PLURALITY OF MAGNETIC LAYERS AND A METHOD FOR REDUCING THEREOF

BACKGROUND OF THE INVENTION

1. Field of the Invention

The present invention generally relates to a magneto optical recording medium such as a magneto optical disc, and more particularly to a magneto optical recording medium of the so-called super resolution reproduction type to record and reproduce information by a spatial frequency higher than the spatial frequency prescribed by the light beam (i.e. the spatial frequency prescribed by the wavelength of the reading light beam and the numerical aperture of the objective lens at the time of reproduction).

2. Description of the Related Art

The magneto optical recording medium of the super resolution reproduction type is quite advantageous to increase the recording density of the information.

The magneto optical disc of this type is provided with a record layer, which carries the information by its magnetization direction, a reproduction layer, which rotates the polarization plane of the reading light beam for the reproducing operation, and an intermediate layer, which magnetically switched-connected to the record layer and the reproduction layer. In operation, the magnetization direction as the information of the record layer at only one portion within the light beam spot is transferred from the record layer to the reproduction layer by the switched connection force through the intermediate layer on the basis of the temperature distribution within the light beam spot. Namely, only the portion within the light beam spot, which may be a high temperature area, a low temperature area or a middle temperature area, allows the magnetization to be transferred by the switched connection force between those magnetic layers. In order to transfer the magnetization of the record layer to the reproduction layer, the switched connection force between those two layers through the intermediate layer should be larger than the coercive force of the reproduction layer.

However, in the practical cases, it is rather difficult to obtain a desirable switched connection force between the reproduction layer and the intermediate layer, and at the same time, obtain a desirable switched connection force between the record layer and the intermediate layer so as to obtain the practically sufficient C/N (Carrier to Noise ratio) by transferring the magnetization of the record layer to the reproduction layer through the intermediate layer only at the particular portion having a certain temperature within the light beam spot.

SUMMARY OF THE INVENTION

It is therefore an object of the present invention to provide a magneto optical recording medium for the super resolution reproduction, which C/N can be improved.

The above object of the present invention can be achieved by a magneto optical recording medium provided with: a record layer, to which information is recorded as a directional condition of magnetization thereof and which comprises a magnetic substance having a Curie temperature $Tc_2$; a reproduction layer, to which the magnetization of the record layer is transferred at a predetermined reproducing temperature Tpb and which comprises a magnetic substance having a Curie temperature $Tc_0$; an intermediate layer disposed between the record layer and the reproduction layer and comprising a magnetic substance having a Curie temperature $Tc_1$ for allowing the magnetization of the record layer to be transferred therethrough at a temperature lower than the Curie temperature $Tc_1$ by a switched connection force between the record layer and the intermediate layer and by a switched connection force between the intermediate layer and the reproduction layer, and for disallowing the magnetization of the record layer to be transferred therethrough at a temperature not lower than the Curie temperature $Tc_1$; and an intermediate auxiliary layer interposed between the record layer and the intermediate layer and comprising a magnetic substance having a Curie temperature $Tc_3$ for increasing the switched connection force between the record layer and the intermediate layer. The Curie temperatures satisfy conditions of: $Tc_1 < Tpb < Tc_2 < Tc_0$ and $Tc_1 \leq Tc_3 \leq Tc_2$.

In order to obtain the sufficient C/N of the magneto optical recording medium in the super resolution reproduction operation, the condition as expressed by the following expression (1) is required.

$$Hwpb + Hcpb < Hwmd - Hcmd \ldots \quad (1)$$

wherein:

coercive force of the reproduction layer: Hcpb switched connection force of the reproduction layer: Hwpb coercive force of the intermediate layer: Hcmd switched connection force of the intermediate layer: Hwmd Accordingly, the above condition can be achieved if the switched connection force Hwmd between the intermediate layer and the record layer can be increased.

Here, the switched connection force between two adjacent magnetic layers is a mutual reaction of the ferromagnetic element which is common to the compositions of the two adjacent magnetic layers. Thus, by interposing a magnetic layer (i.e. the intermediate auxiliary layer), which includes both of the different rare earth elements of the intermediate layer and the record layer, the magnetically switched connection force can be increased between the record layer and the intermediate layer having different compositions.

According to the above described construction of the present invention, the switched connection force between the intermediate layer and the record layer can be increased by virtue of the intermediate auxiliary layer while the switched connection force between the reproduction layer and the intermediate layer can be kept to be at a certain high level. Namely, the switched connection force between the intermediate layer and the record layer can be relatively increased with respect to that between the reproduction layer and the intermediate layer. Consequently, transferring the magnetization from the record layer to the reproduction layer can be efficiently performed, so that the information can be separated from the noise by a high separation ratio and the C/N can be improved in the super resolution reproduction according to the present invention.

As one aspect of the present invention, the magnetic substance of the record layer comprises an alloy of a rare earth material comprising Tb (terbium) or Dy (dysprosium) and a transition metal comprising both of Fe (iron) and Co (Cobalt) e.g. an alloy of TbFeCo, an alloy of GdTbFeCo, an alloy of GdDyFeCo and an alloy of NdDyFeCo. The magnetic substance of the intermediate layer comprises an alloy of a rare earth material comprising Dy and a transition metal comprising both of Fe and Co e.g. an alloy of DyFeCo. The magnetic substance of the intermediate auxiliary layer comprises an alloy of a rare earth material including both of Tb and Dy and a transition metal comprising both of Fe and Co e.g. an alloy of TbDyFeCo. In this case, since the intermediate auxiliary layer includes both of Tb, which is common to the record layer, and Dy, which is common to the intermediate layer, the switched connection force between the record layer and the intermediate layer can be efficiently increased by virtue of the intermediate auxiliary layer interposed therebetween.

In the present invention, the magnetic substance of the reproduction layer may comprise one selected from a group consisting of a laminated film of Pt and Co, an alloy of Pt and Co, and a ferrimagnetic substance of GdFeCo. Thus, the magneto optical recording and reproduction by means of the magneto optical effect such as Kerr effect or Faraday effect can be performed by the reproduction layer.

In another aspect of the present invention, it is preferable that the magneto optical recording medium is further provided with a protection layer disposed on the record layer on a side opposite to the intermediate auxiliary layer for protecting the record layer. Thus, the record layer can be safely protected from the external environment and mechanical damages.

In another aspect of the present invention, it is preferable that the magneto optical recording medium is further provided with a background layer disposed on the reproduction layer on a side opposite to the intermediate auxiliary layer for protecting the record layer and enhancing a magnetic property of the reproduction layer. Thus, the reproduction layer can be safely protected from the external environment and mechanical damage, and that the magneto optical recording and reproducing operation can be more efficiently performed by virtue of the background layer. In this case, the background layer may be disposed on a disc substrate.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7, which consist of FIGS. 7A and 7B, are cross sectional views of comparison examples;

FIG. 8 is a graph showing the hysteresis characteristic of the Kerr rotation angle of the first comparison example.

DETAILED DESCRIPTION OF THE PREFERRED EMBODIMENTS

Referring to the accompanying drawings, embodiments of the present invention will be now explained.

(i) Basic Construction and Principle of Invention

Figure 1:
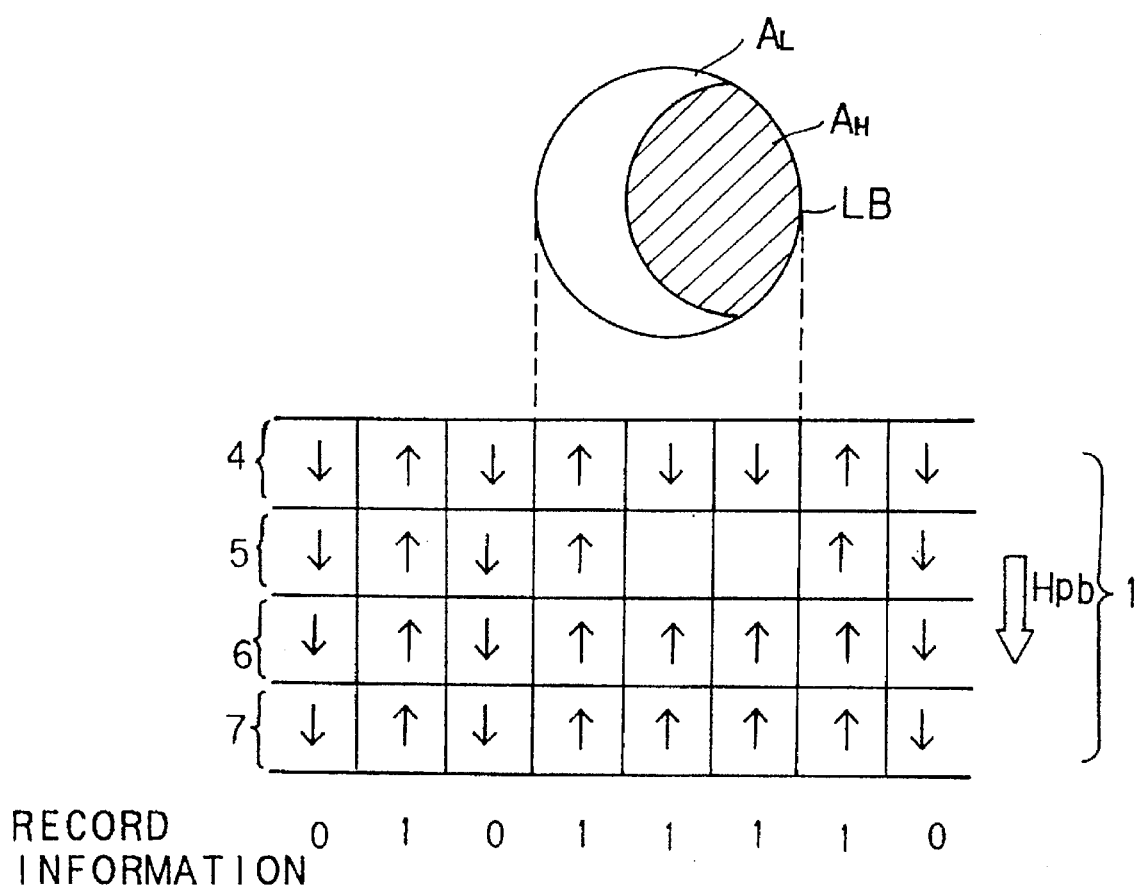
FIG. 1 is a diagram for explaining a reproduction principle of embodiments of the present invention.

First of all, a basic construction and a principle of the present invention, on which preferred embodiments are based, are explained with referring to FIG. 1.

In FIG. 1, each of arrows in layers represents the magnetization direction of each portion of each magnetic layer. As shown in FIG. 1, a magneto optical disc 1 is provided with a reproduction layer 4, an intermediate layer 5, an intermediate auxiliary layer 6 and a record layer 7.

The reproduction layer 4 functions as a condition changing layer. The reproduction layer 4 is positioned on the side facing the reading light beam. The intermediate auxiliary layer 6 comprises a ferrimagnetic substance same as the intermediate layer 6 and the record layer 7. Further, the intermediate auxiliary layer 6 comprises dysprosium (Dy) and terbium (Tb), so that the intermediate layer 5 and the record layer 7 are magnetically switched-connected through the intermediate auxiliary layer 6, and that the magnetization of the record layer 7 is transferred to the intermediate layer 5.

In each magnetic layer, the arrow directed downward indicates the magnetic domain which carries the record information "0" while the arrow directed upward indicates the magnetic domain which carries the record information "1". The direction of the magnetization as the record information is recorded to the record layer 7 by the external magnetic field exceeding the coercive force of the record layer 7.

Figure 2:
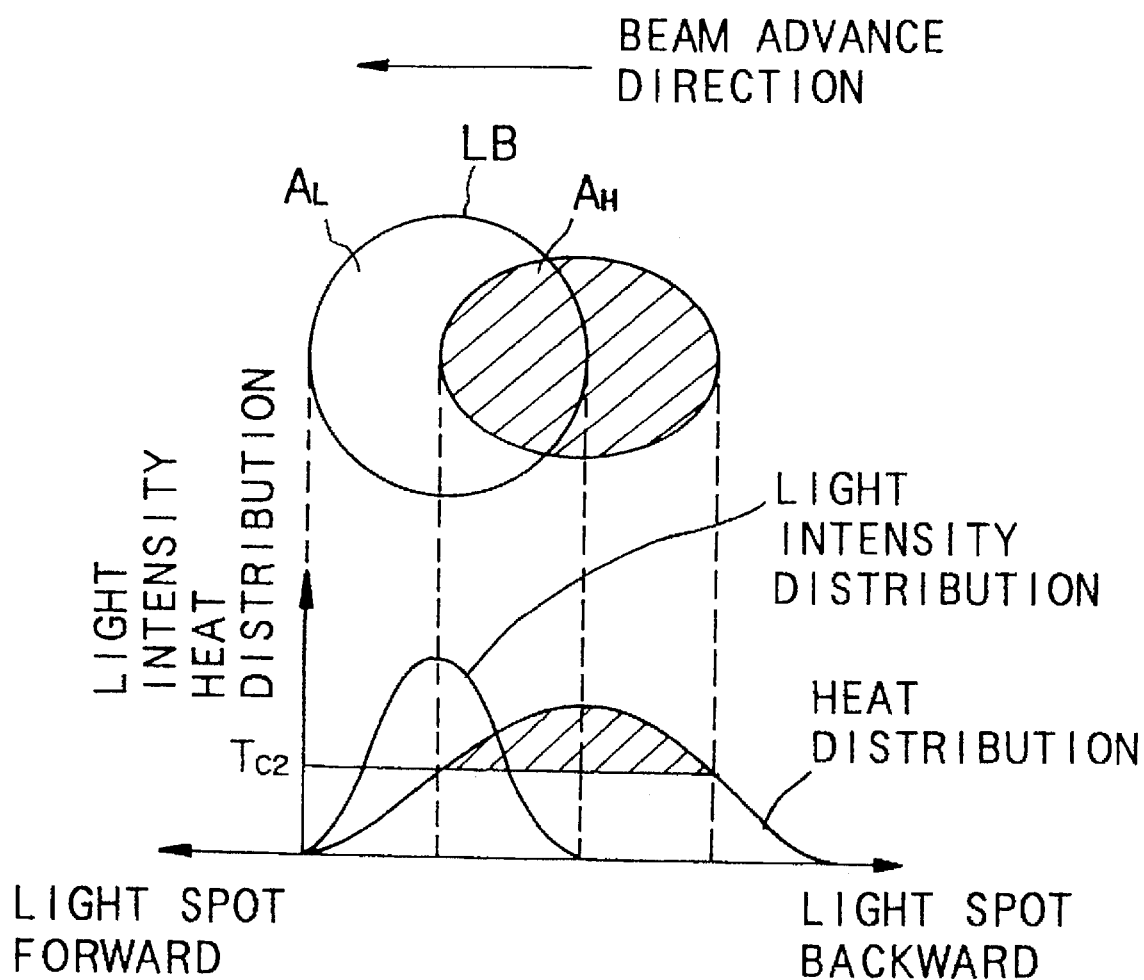
FIG. 2 is a diagram for explaining a FAD super resolution reproduction in the embodiments of the present invention.

Here, the FAD (Front Aperture Detection) super resolution reproduction technique as one of the super resolution reproduction techniques, which can be employed for the magneto optical disc of the present invention, is explained here with referring to FIG. 2.

FIG. 2 shows the temperature distribution, which is caused by the light beam spot, of the optical disc. As shown in FIG. 2, the light intensity distribution is such that the maximum point is located at the center of the light beam spot LB, which has the circular shape, while the optical disc is irradiated by the reading light beam. On the other hand, the maximum point of the temperature distribution of the surface of the optical disc is located at a position shifted backward along the light beam advance direction by a small distance. The FAD is a reproduction method of performing the reproduction by use of the forward half portion of the light beam spot LB, where the temperature is relatively low in the temperature distribution of the light beam spot LB (i.e. the low temperature area $A_L$).

When the optical disc is irradiated by the light beam spot LB, the surface temperature and the temperatures of the magnetic layers of the optical disc are increased. In the low temperature area $A_L$, the temperature of the intermediate layer does not reach the Curie temperature so that the magnetization does not disappear. Thus, the intermediate layer transmits the switched connection force therethrough between the record layer and the reproduction layer. Accordingly, the magnetization direction in the magnetic domain of the record layer is transmitted to the reproduction layer via the intermediate layer.

However, the temperature of the intermediate layer at the backward half portion of the light beam spot LB (i.e. the high temperature area $A_H$) is further increased to exceed the Curie point so that the magnetization disappears. When the magnetization disappears, the switched connection force also disappears. For example, assuming that the composition of the intermediate layer is $Dy_{22}(Fe_{90}Co_{10})_{78}$ [at %], the temperature at which the magnetization disappears is about 150° C. Thus, the magnetization direction of the record layer is not transferred to the reproduction layer, and the direction of the magnetization of the reproduction layer is aligned along the direction of the external reproduction magnetic field. Namely, it is not possible to reproduce the information from the high temperature area $A_H$, which functions as the masking area.

When the light beam spot LB has passed away and the temperature becomes down to be the low temperature again, the magnetization direction is transferred from the record layer to the reproduction layer as the magnetization is generated in the intermediate layer, and it is ready for the next reproduction.

In this manner, the FAD super resolution reproduction is performed on the basis of the temperature distribution in the light beam spot.

Nextly, the operation principle of the present invention is explained with referring to FIG. 1.

At the time of reproduction, the reproduction magnetic field Hpb is applied from the external. In the domain, which is not irradiated by the light beam spot LB, of the optical disc 1, the magnetization of the record layer 7 is transferred to the intermediate layer 5 and further to the reproduction layer 4 by a strong switched connection force by the action of the intermediate auxiliary layer 6.

When the optical disc 1 is rotated, and the optical disc 1 is irradiated by the light beam spot LB, the surface temperature of the optical disc 1 is increased as shown in the temperature increasing curve of FIG. 2. The forward half portion of the light beam spot LB is the low temperature area $A_L$ where the temperature increase is relatively little. In this area, since it is not higher than the Curie temperature $Tc_1$ of the intermediate layer 5, the switched connection force is not cut off by the intermediate layer 5. Thus, the magnetization of the record layer 7 is transferred to the reproduction layer 4.

On the other hand, the backward half portion of the light beam spot LB becomes the high temperature area $A_H$. At this time, since the temperature of the intermediate layer 5 is not lower than the Curie temperature $Tc_1$, the magnetization disappears. When the magnetization disappears, the switched connection force, which has been prescribing the magnetization direction of the reproduction layer 4, also disappears. The magnetization direction of the reproduction layer 4 is now directed to the direction of the reproduction magnetic field Hpb. The directional condition of the magnetization of the low temperature area $A_L$ becomes "0" as the record information, resulting in the condition where the information cannot be read out i.e. the masking condition.

Further, when the light beam spot LB has passed, the temperature of the intermediate layer 5 is decreased to be not higher than the Curie temperature $Tc_1$. At this time, the magnetization direction of the record layer 7 is transferred to the intermediate layer 5 by the action of the intermediate auxiliary layer 6. When the magnetic domain is generated in the intermediate layer 5, the magnetization direction of the reproduction layer 4 becomes the same as that of the record layer 7 by the switched connection force between the intermediate layer 5 and the reproduction layer 4.

According to the embodiments based on the above described basic construction and the principle of the present invention, by interposing the intermediate auxiliary layer 6, the switched connection force between the record layer 7 and the intermediate layer 5 can be increased, while maintaining the switched connection force between the intermediate layer 5 and the reproduction layer 4 to be sufficiently large. Thus, the transferring operation of the magnetization from the record layer 7 to the reproduction layer 4 can be sufficiently performed. Consequently, the information can be separated from the noise by a high separation rate, and the C/N can be improved in the reproduction based on the FAD method.

Nextly, the embodiments based on the above described basic construction and the principle of the present invention will be explained.

(ii) First Embodiment

Figure 3:
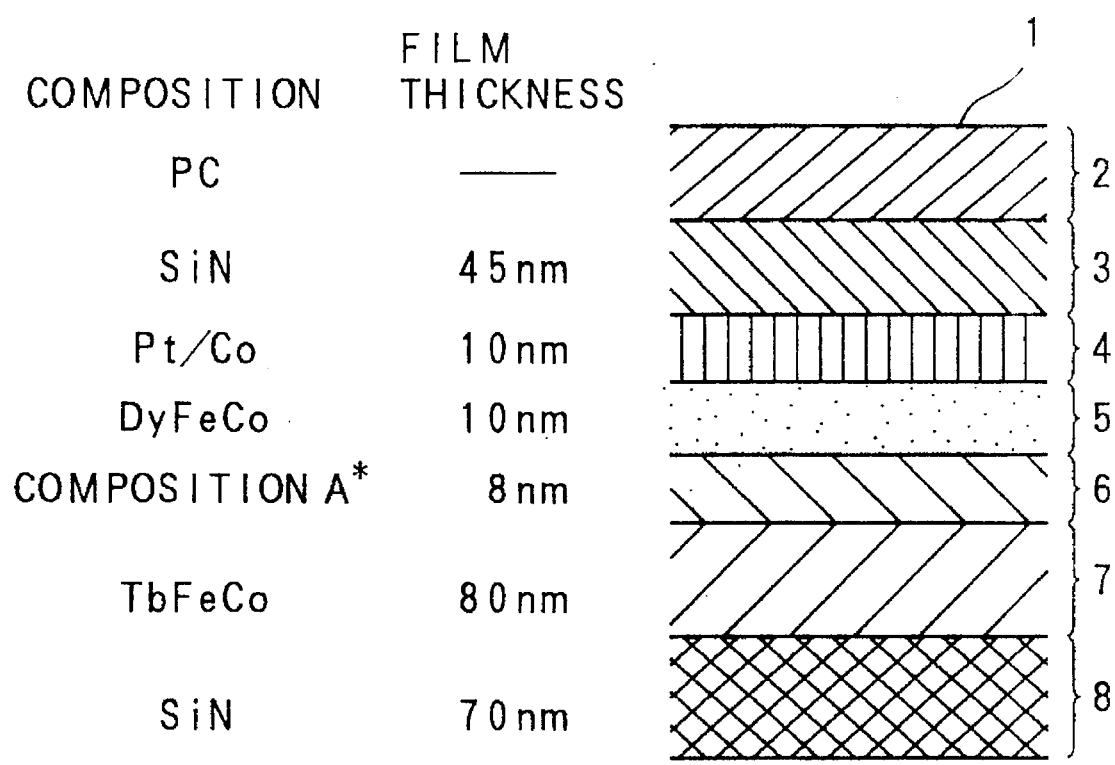
FIG. 3 is a cross sectional view of a first embodiment of the present invention.

FIG. 3 shows a magneto optical disc as a first embodiment of the present invention. In FIG. 3, the same constitutional elements as those in FIG. 1 carry the same reference numerals.

As shown in FIG. 3, an optical disc 1 is provided with: a transparent substrate 2 for protecting a surface of magnetic layers and transmitting light; a background layer 3 for protecting magnetic layers and transmitting light; the reproduction layer 4 for rotating the polarization plane of the reading light beam in accordance with the direction of the internal magnetization thereof when it is irradiated by the light beam spot at the time of reproduction; the intermediate layer 5 for transmitting the switched connection force between the reproduction layer 4 and the record layer 7, which magnetization domain disappears at the high temperature area in the light beam spot; the intermediate auxiliary layer 6 for transmitting the magnetically switched connection force between the intermediate layer 5 and the record layer 7; the record layer 7, which exhibits a high coercive force and which is magnetized by the recording magnetization at the time of recording; and a protection layer 8 for protecting the record layer 7.

Nextly, the composition of each layer is explained.

The background layer 3 and the protection layer 8 function to protect the layers between them including the reproduction layer 4. The background layer 3 also functions to improve the Kerr rotation angle of the reproduction layer 4. As the film property for the background layer 3 and the protection layer 8, it is preferable not to give an influence to the optical characteristic of the optical disc 1, and to be transparent and dense enough to prevent water or moisture etc. from permeating therethrough. As the film composition of the background layer 3 and the protection layer 8, other than SiN in FIG. 1, AlN, $Ta_2O_5$ etc. can be employed. As the film thickness, it is preferable to be not less than the thickness which can stand against aging and oxidizing (e.g. about 20 [nm]), and it is more preferable not to give an influence to the heat transmission property or the optical transmission property (e.g. about 100 [nm]).

The reproduction layer 4 functions as the condition changing layer which causes the so-called Kerr rotation i.e. the rotation of the polarization plane of the reading light beam. As for the film property of the reproduction layer 4, it is preferable to exhibit the magneto optical property such as the Kerr effect or the Faraday effect where the magnetization becomes perpendicular by the irradiation of the light beam and it is necessary that the rotation angle of the light polarization plane is changed in correspondence with the internal magnetization of the reproduction layer 4. As for the composition of the reproduction layer 4, it is possible to use a Pt—Co alloy, a ferrimagnetic substance which has the composition of GdFeCo etc. other than the Pt/Co laminated film of FIG. 3. As for the film thickness of the reproduction layer 4, in order to utilize the Kerr effect, it is preferable to be not less than the film thickness which reflection coefficient becomes about 40% (for example, about 8 [nm]), and not more than the film thickness which can maintain the perpendicular magnetization of the film (for example, about 30 [nm]).

The intermediate layer 5 functions to cut off the switched connection force between the reproduction layer 4 and the record layer 6 at the mask area portion (i.e. the high temperature area $A_H$) where it is higher than its Curie temperature. As the film property of the intermediate layer 5, it is preferable to maintain the perpendicular magnetization at the low temperature area of the light beam spot so as to transmit the switched connection force, and make the magnetic domain disappeared at the high temperature area of the light beam spot. Therefore, it is preferable that the Curie temperature $Tc_1$ of the intermediate layer 5 is not higher than the temperature (reproduction temperature Tpb: for example, 100° to 150° C.) at the vicinity of the boundary between the low temperature area $A_L$ and the high temperature area $A_H$ of the light beam spot shown in FIG. 7. As for the composition of the intermediate layer 5, the alloy of the rare earth material, which comprises Dy etc., and the transition metal, which comprise FeCo etc., is preferably used. As for the film thickness of the intermediate layer 5, it is preferable to be not less than the film thickness which is enough to cut off the switched connection force between the reproduction layer 4 and the record layer 7 when the temperature of the intermediate layer 5 reaches the Curie point $Tc_1$ (for example, more than about 5 [nm]), and not more than the film thickness which has a high efficiency to transfer the magnetic domain from the record layer 7 to the reproduction layer 4 so as not to degrade the recording sensitivity (for example, less than about 30 [nm]).

The record layer 7 is magnetized by the external magnetic field at the time of recording. As for the film property of the record layer 7, it is preferable that the magnetic domain thereof is not influenced by the magnetization of the reproduction layer 4 and that the magnetization does not disappear even at the highest temperature of the light beam spot. As for the composition of the record layer 7, it is preferable to be an alloy including a rare earth material, which comprises Tb etc., and a transition metal, which comprises FeCo etc.. For example, other than the composition of TbFeCo of FIG. 3, GdTbFeCo, GdDyFeCo, NdDyFeCo etc. may be used. As for the film thickness of the record layer 7, it is preferable to be such a thickness necessary to maintain the magnetic domain stable regardless of the magnetization direction of the reproduction layer 4 (for example, not less than about 30 [nm]) and not to degrade the recording sensitivity (for example, not more than 100 [nm]).

The composition of the alloy is important as for the above mentioned reproduction layer 4, the intermediate layer 5 and the record layer 7. The relationship between the Curie temperatures of those layers are expressed by the following expression (2), wherein the Curie temperature of the reproduction layer 4 is represented by $Tc_0$, the Curie temperature of the intermediate layer 5 is represented by $Tc_1$ and the Curie temperature of the record layer 7 is represented by $Tc_2$.

$$Tc_1 < Tc_2 < Tc_0 \ldots \quad (2)$$

The intermediate auxiliary layer 6 is disposed between the intermediate layer 5 and the record layer 7, which have weak switched connection force with each other. The intermediate auxiliary layer 6 has the magnetically switched connection force with the intermediate layer 5 and the record layer 7 in order to efficiently transfer the magnetization of the record layer 7 to the intermediate layer 5 and further to the reproduction layer 4. As for the film property of the intermediate auxiliary layer 6, it is preferable to give the sufficient switched connection force between the intermediate layer 5 and the record layer 7. In order to have such a film property, the relationship between the Curie temperatures of those layers are expressed by the following expression (3), wherein the boundary temperature of the high temperature area $A_H$ and the low temperature area $A_L$ of the light beam spot is represented by Tpb (i.e. the reproduction temperature), the Curie temperature of the intermediate auxiliary layer 6 is represented by $Tc_3$, the Curie temperature of the intermediate layer 5 is represented by $Tc_1$ and the Curie temperature of the record layer 7 is represented by $Tc_2$.

$$Tc_1 < Tpb < Tc_2 \text{ and } Tc_1 \leq Tc_3 \leq Tc_2 \ldots \quad (3)$$

As for the composition of the intermediate auxiliary layer 6, in order to transmit the switched connection force, it is preferable to include both of the composition of the intermediate layer 5 and the composition of the record layer 7. Namely, with respect to the compositions of the intermediate layer 5 and the record layer 7 in the present embodiment, the alloy of TbDyFeCo including both of Tb and Dy is preferred as the composition of the intermediate auxiliary layer 6.

As for the film thickness of the intermediate auxiliary layer 6, it is preferable to be not less than the least thickness among the range of the producible thickness as the film thickness enough to transmit the switched connection force to the intermediate layer 5 and the record layer 7 (for example, not less than about 3 [nm]), and not more than the film thickness which does not degrade the recording sensitivity (for example, not more than about 30 [nm]).

Under the above described conditions, the concrete compositions and the film thicknesses which satisfy the expressions (2) and (3) will be shown in Table 1.

TABLE 1

| | COMPOSITION | RANGE OF FILM THICKNESS [nm] | |
|---|---|---|---|
| | FORMULA [at %] | MIN. | MAX. |
| REPRODUCTION LAYER | Pt/Co LAMINATED FILM, PtCo ALLOY FILM | 8 | 30 |
| INTERMEDIATE LAYER | Dyx (Fe (100 − y) Coy) (100 − y) (16 ≦ x ≦ 28, 5 ≦ y ≦ 20) | 5 | 30 |
| INTERMEDIATE AUXILIARY LAYER | (TbxDy (100 − x)) y · Fe (100 − z) Coz) (100 − y) (3 ≦ x ≦ 97, 16 ≦ y ≦ 28, 5 ≦ z ≦ 20) | 3 | 30 |
| RECORD LAYER | Tbx (Fe (100 − y) Coy) (100 − x) (16 ≦ x ≦ 28, 5 ≦ y ≦ 20) | 30 | 100 |

In FIG. 3, as the composition showing the preferable property of the intermediate auxiliary layer 6 of the first embodiment, the composition expressed by the next formula i.e. the expression (4) is selected from the figures in Table 1.

$$(Tb_{50}Dy_{50})_{19}(Fe_{90}Co_{10})_{81} \text{ [at \%]} \ldots \quad (4),$$

In addition, each figure in the composition formula indicates the ratio of the number of atoms of the two types of alloys, which is called as the atomic percent [at %].

For example, in such a formula as "$A_n B_m$ [at %]", it is "n+m=100", so that this formula means that this material is composed of A atoms by n % and B atoms by m % out of the total atoms.

Figure 4:
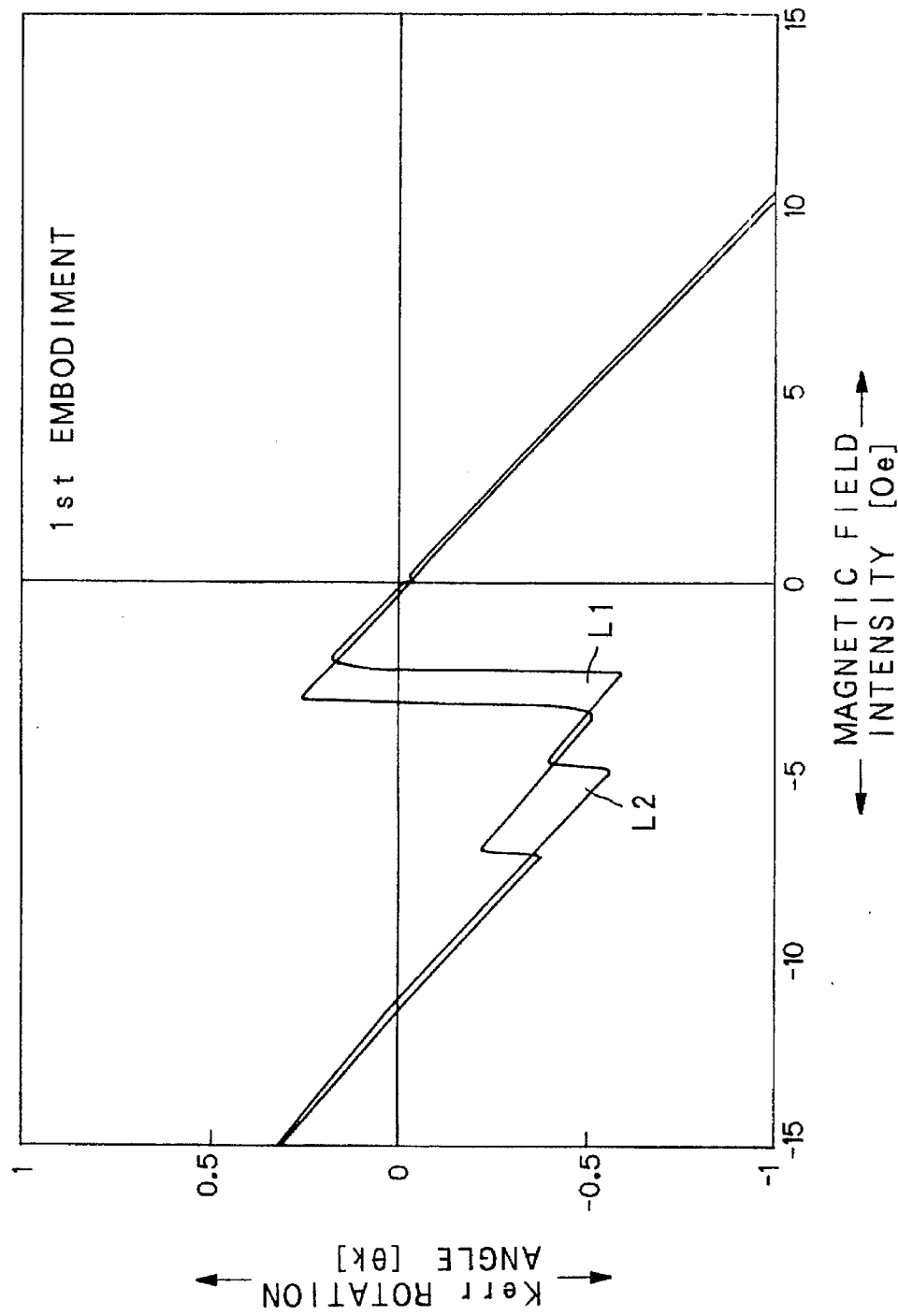
FIG. 4 is a graph showing the hysteresis characteristic of the Kerr rotation angle of the first embodiment.

FIG. 4 shows the hysteresis characteristic of the Kerr rotation angle of the first embodiment. In FIG. 4, a loop L1 is a hysteresis loop due to the reproduction layer 4, and a loop L2 is a hysteresis loop due to the intermediate layer 5.

As shown in FIG. 4, the hysteresis loop L1 due to the reproduction layer 4 is completely separated from the hysteresis loop L2 due to the intermediate layer 5. In this manner, according to the first embodiment, since the switched connection force between the intermediate layer 5 and the record layer 7 is improved by the action of the intermediate auxiliary layer 6 having the composition expressed by the expression (4), transferring of the magnetization from the record layer 7 to the reproduction layer 4 can be efficiently performed. Further, since the sufficient switched connection force is exhibited between the intermediate layer 5 and the reproduction layer 4, the optical disc 1 has a high C/N.

For example, under the measuring condition listed below, the optical disc 1 of the present embodiment has the C/N of 38 [dB], and has a characteristic similar to that of an ideal optical disc, which is supposed to identically have the C/N of 40 [dB].

C/N measuring condition:

wave length: 680 [nm]

numerical aperture NA: 0.55 linear velocity: 4.24 [m/s]

record information frequency: 5.3 [MHz]

mark length: 0.4 [μm]

writing laser output power Pw: 5.5 [mW]

recording magnetic field intensity Hw: 500 [Oe]

reading laser output power Pr: 2.0 [mW]

reproducing magnetic field intensity Hr: 600 [Oe]

(iii) Second Embodiment

Figure 5:
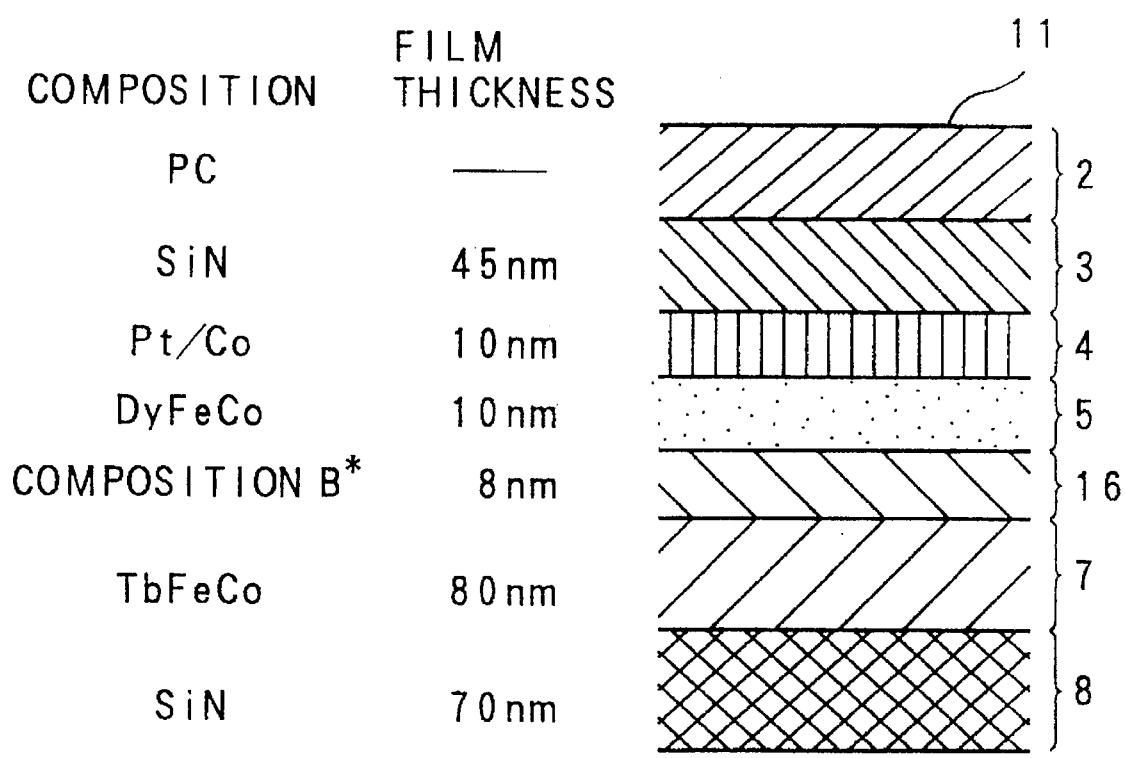
FIG. 5 is a cross sectional view of a second embodiment of the present invention.

The second embodiment of the present invention is provided with the same layers as the first embodiment except the intermediate auxiliary layer as shown in FIG. 5. In FIG. 5, the same constitution elements as those in the first embodiment of FIG. 3 carry the same reference numerals, and the explanations thereof are omitted.

In FIG. 5, an optical disc 11 is provided with: the substrate 2, the background layer 3, the reproduction layer 4, the intermediate layer 5, an intermediate auxiliary layer 16, the record layer 7 and the protection layer 8.

The intermediate auxiliary layer 16 has the composition expressed by the following expression (5).

$$(Tb_3Dy_{97})_{19}(Fe_{90}Co_{10})_{81} \text{ [at \%]} \ldots \quad (5),$$

Figure 6:
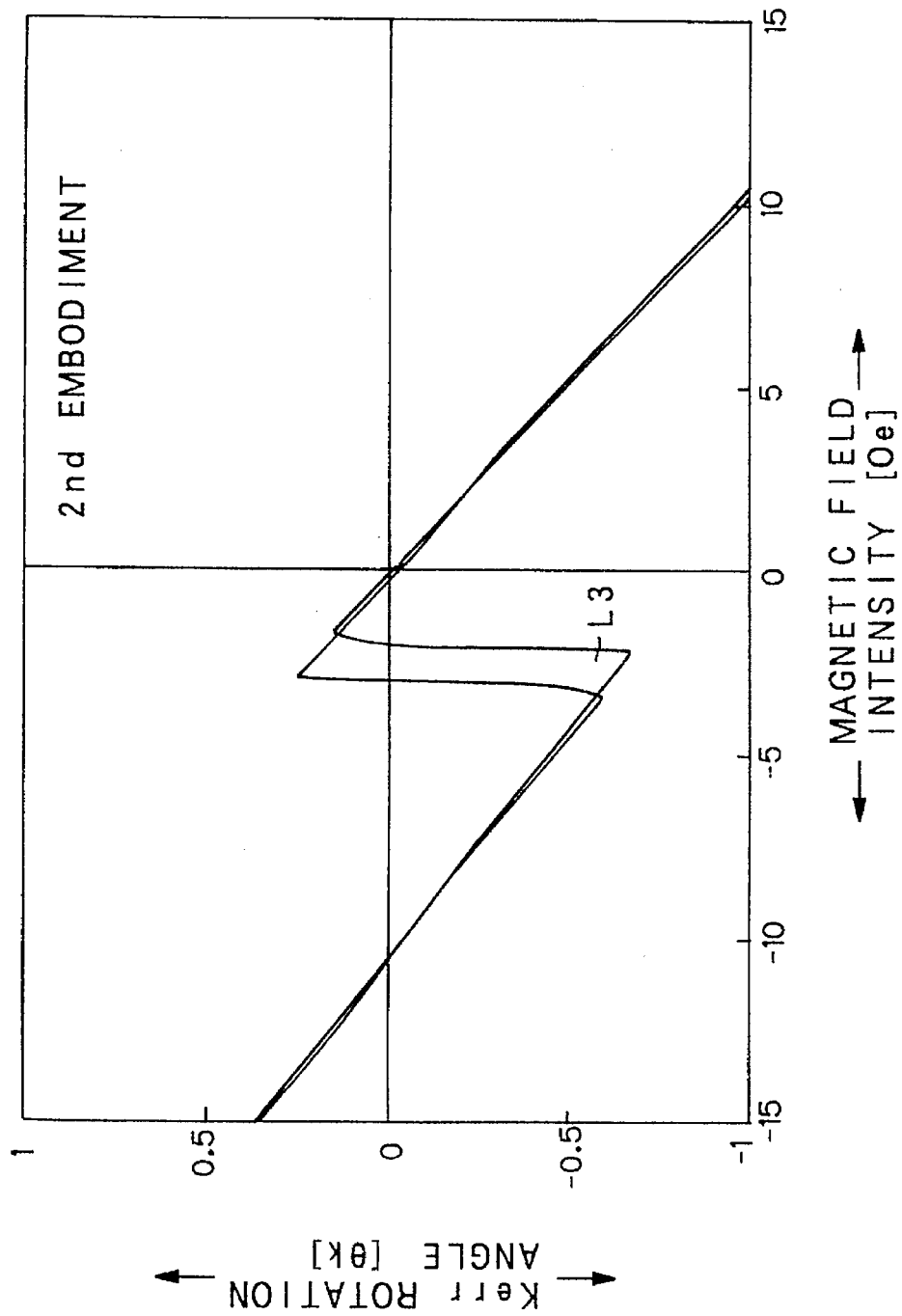
FIG. 6 is a graph showing the hysteresis characteristic of the Kerr rotation angle of the second embodiment.

FIG. 6 shows the hysteresis characteristic of the Kerr rotation angle of the second embodiment. In FIG. 6, a loop L3 is a hysteresis loop due to the reproduction layer 4. Since the hysteresis loop due to the intermediate layer 5 is position far away from the range shown in FIG. 5, it is not illustrated.

Accordingly, the second embodiment exhibits a high C/N. For example, under the aforementioned C/N measuring condition in the first embodiment, the optical disc 11 of the present embodiment has the C/N of 38 [dB], and has a characteristic similar to that of an ideal disc in the same manner as in the first embodiment.

(iv) Comparison Examples

Figure 9:
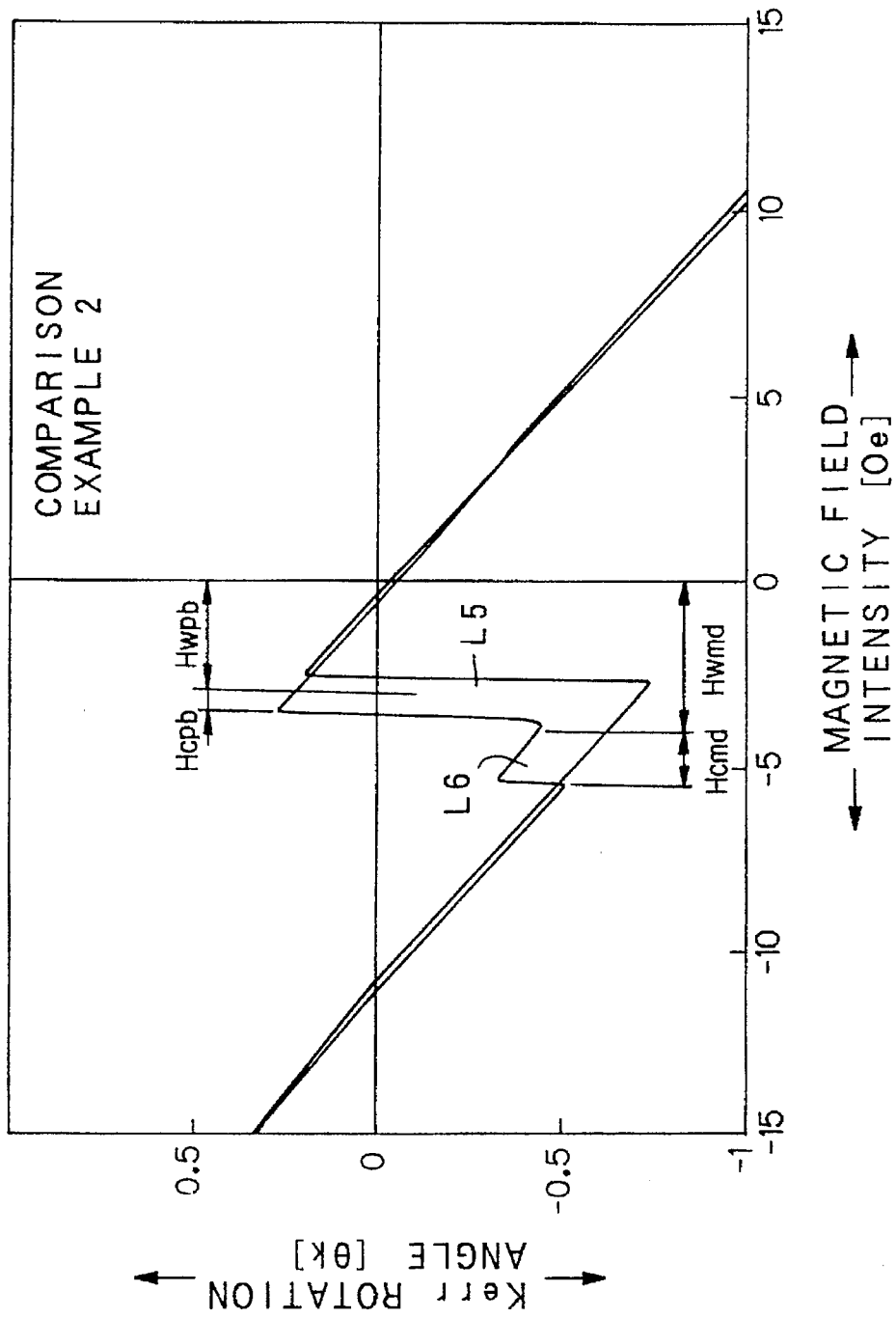
FIG. 9 is a graph showing the hysteresis characteristic of the Kerr rotation angle of the second comparison example.

In order to study the advantageous effect brought by the intermediate auxiliary layer of the first or second embodiment, the comparison examples are investigated here with referring to FIGS. 7 to 9.

FIG. 7A shows an optical disc 21 as a first comparison example, which has such a construction that the intermediate auxiliary layer is removed from the construction of the first or second embodiment of the present invention, and the record layer 7 is positioned directly on the intermediate layer 5. Other elements and constructions are the same as those of the first or second embodiment.

FIG. 7B shows an optical disc 31 as a second comparison example, in which the material of the intermediate layer 5a is different from that of the first comparison example. Namely, the intermediate layer 5a comprises DyFeCo. Other elements and constructions are the same as those of the first comparison example.

FIG. 8 shows a hysteresis characteristic of the Kerr rotation angle of the optical disc 21 of the first comparison example. In order to transfer the magnetization of the record layer to the reproduction layer in the construction of the optical disc 21, the relationship between the switched connection force Hwpb and the coercive force Hcpb of the reproduction layer 4 should satisfy the following expression (6).

$$Hwpb > Hcpb \ldots \quad (6)$$

Thus, in order to obtain the practically enough C/N, it is required that the value of "Hwpb–Hcpb" is not less than 1 [kOe]. However, in this first comparison example, as shown in the hysteresis characteristic of FIG. 8, the value of "Hwpb–Hcpb" of the hysteresis loop L4 of the reproduction layer (i.e. Pt/Co multiple layered film) is only about 0.7 [kOe], resulting in that the practically enough C/N cannot be obtained.

The cause of this low value of "Hwpb–Hcpb" is that the switched connection force Hw between the reproduction layer 4 and the intermediate layer 5 is essentially weak. Namely, in the first comparison example, the switched connection force Hw is influenced by the film formation condition and the composition of the film such that the switched connection force between TbFe, which is the composition of the intermediate layer 5, and the Pt/Co laminated film, which is the reproduction layer 4, is not sufficiently applied. Under the aforementioned C/N measuring condition in the first embodiment, the C/N of the first comparison example is measured to be as much as about 34 [dB], which is much lower than that of the first or second embodiment of the present invention as well as the ideal optical disc.

In the second comparison example of FIG. 7B, since the composition of the intermediate layer 5a is DyFeCo, the switched connection force between the intermediate layer 5a and the reproduction layer 4 is sufficient. The hysteresis characteristic of the second comparison example can be obtained as shown in FIG. 9.

As shown in FIG. 9, the value "Hwpb–Hcpb" is about 2.6 [kOe] in a hysteresis characteristic loop L5 of the reproduction layer 4 (Pt/Co multiple layered film), resulting in that the switched connection force between the record layer and the intermediate layer is sufficient.

However, as shown in FIG. 9, there are two hysteresis loops i.e. the loop L5 and another loop L6, which is the hysteresis loop of the intermediate layer 5a, are overlapped to each other. Here, the intermediate layer 5a is switched-connected more strongly to the reproduction layer 4 than to the record layer 7. This means that, when the magnetization of the intermediate layer 5a once disappears at the high temperature and appears again at the low temperature, the magnetization directions of the intermediate layer 5a are not aligned in the magnetization direction of the record layer 7, but are aligned in the magnetization direction of the reproduction layer 4. As a result, in the low temperature area, the magnetization direction of the record layer 7 is not sufficiently transferred to the reproduction layer 4, so that the sufficient C/N cannot be obtained in the second comparison example although the switched connection force between the intermediate layer 5a and the reproduction layer 4 is sufficient. Under the aforementioned C/N measuring condition in the first embodiment, the C/N of the second comparison example is measured to be as much as about 25 [dB], which is much lower than that of the first or second embodiment of the present invention as well as the ideal optical disc.

In FIG. 9, in order to obtain the sufficient C/N of the optical disc, the condition as expressed by the aforementioned expression (1) is required.

The aforementioned first or second embodiment of the present invention satisfies the above condition of the expression (1) by increasing the switched connection force Hwmd between the intermediate layer and the record layer by disposing the intermediate auxiliary layer therebetween.

However, in case of the second comparison example, the intermediate layer and the record layer comprise the same material i.e. the ferrimagnetic substance of the alloy of the rare earth material and the transition metal. Here, the switched connection force between two adjacent magnetic layers is a mutual reaction of the ferromagnetic element which is common to the compositions of the two adjacent magnetic layers. Accordingly, since there is no strong mutual reaction caused by the rare earth material but there is only a strong mutual reaction by the transition metals of Fe and Co, the sufficient switched connection force cannot be obtained between the intermediate layer and the record layer in case of the second comparison example.

(v) Other Modified Embodiments

The above explained embodiments can be modified in various manners.

For example, although the FAD method is employed in the embodiments, the RAD (Rear Aperture Detection) method, which utilizes the high and low temperature area, or the double mask method, which utilizes both of the middle temperature area and the high temperature area, may employed in place of the FAD method. Namely, in case of giving the predetermined property to the optical disc by improving the switched connection force between the two magnetic layers which are to be magnetically switched-connected, the intermediate auxiliary layer may be interposed between those two magnetic layers. As a result, by virtue of the action of the present invention, the switched connection force between those two magnetic layers is increased, so that an optical disc having a desired magnetic property can be produced.

Further, in the present invention, although the Kerr effect is utilized for the magnetic optical light polarization plane rotation, the Faraday effect using the transmitted light may be utilized in place of the Kerr effect, by adjusting the thickness of each magnetic layer so as to transmit the light therethrough.

According to the present embodiments, the laminated layered film or the alloy film of the metal comprising the platinum (Pt) and the metal comprising cobalt (Co), is used as the reproduction layer. The intermediate auxiliary layer, which is composed to include both compositions of the record layer and the intermediate layer, is interposed between the record layer and the intermediate layer. Thus, the switched connection force between the intermediate layer and the record layer can be effectively increased even if the composition of the intermediate layer is chosen to increase the switched connection force between the intermediate layer and the reproduction layer. Then, since the magnetization of the intermediate layer disappears at the temperature not less than the reproduction temperature Tpb, the reproduction by means of the FAD method can be performed with the high C/N.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magneto optical recording medium comprising:

a record layer, to which information is recorded as a directional condition of magnetization thereof and which comprises a magnetic substance having a Curie temperature $Tc_2$;

a reproduction layer, to which the magnetization of said record layer is transferred at a predetermined reproducing temperature Tpb and which comprises a magnetic substance having a Curie temperature $Tc_0$;

an intermediate layer disposed between said record layer and said reproduction layer and comprising a magnetic substance having a Curie temperature $Tc_1$ for allowing the magnetization of said record layer to be transferred therethrough at a temperature lower than the Curie temperature $Tc_1$ by a switched connection force between said record layer and said intermediate layer and by a switched connection force between said intermediate layer and said reproduction layer, and for disallowing the magnetization of said record layer to be transferred therethrough at a temperature not lower than the Curie temperature $Tc_1$; and an intermediate auxiliary layer interposed between said record layer and said intermediate layer and comprising a magnetic substance having a Curie temperature $Tc_3$ for increasing the switched connection force between said record layer and said intermediate layer, said Curie temperatures satisfying conditions of:

$$Tc_1 < Tpb < Tc_2 < Tc_0$$

and $$Tc_1 \leq Tc_3 \leq Tc_2.$$

2. A magneto optical recording medium according to claim 1, wherein:

said magnetic substance of said record layer comprises an alloy of a rare earth material comprising Tb and a transition metal comprising both of Fe and Co;

said magnetic substance of said intermediate layer comprises an alloy of a rare earth material comprising Dy and a transition metal comprising both of Fe and Co; and said magnetic substance of said intermediate auxiliary layer comprising an alloy of a rare earth material including both of Tb and Dy and a transition metal comprising both of Fe and Co.

3. A magneto optical recording medium according to claim 2, wherein:

said magnetic substance of said reproduction layer comprises one selected from a group consisting of a laminated film of Pt and Co, an alloy of Pt and Co, and a ferrimagnetic substance of GdFeCo.

4. A magneto optical recording medium according to claim 1, wherein said magnetic substance of said intermediate layer comprises an alloy of DyFeCo.

5. A magneto optical recording medium according to claim 1, wherein said magnetic substance of said intermediate auxiliary layer comprises an alloy of TbDyFeCo.

6. A magneto optical recording medium according to claim 1, wherein said magnetic substance of said record layer comprises one selected from a group consisting of an alloy of TbFeCo, an alloy of GdTbFeCo, an alloy of GdDyFeCo and an alloy of NdDyFeCo.

7. A magneto optical recording medium according to claim 1, further comprising a protection layer disposed on said record layer on a side opposite to said intermediate auxiliary layer for protecting said record layer.

8. A magneto optical recording medium according to claim 1, further comprising a background layer disposed on said reproduction layer on a side opposite to said intermediate auxiliary layer for protecting said record layer and enhancing a magnetic property of said reproduction layer.

9. A magneto optical recording medium according to claim 1, wherein said magnetic substance of said intermediate auxiliary layer comprises a material including both of a material of said magnetic substance of said record layer and a material of said magnetic substance of said intermediate layer.

* * * * *